(12) United States Patent
Hiramuki

(10) Patent No.: US 12,496,520 B2
(45) Date of Patent: Dec. 16, 2025

(54) COMPUTER-READABLE NON-TRANSITORY STORAGE MEDIUM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventor: Yutaka Hiramuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 271 days.

(21) Appl. No.: 18/331,724

(22) Filed: Jun. 8, 2023

(65) Prior Publication Data
US 2023/0398446 A1 Dec. 14, 2023

(30) Foreign Application Priority Data
Jun. 10, 2022 (JP) .................................. 2022-094433

(51) Int. Cl.
*A63F 13/5258* (2014.01)
*A63F 13/5255* (2014.01)

(52) U.S. Cl.
CPC ...... *A63F 13/5258* (2014.09); *A63F 13/5255* (2014.09)

(58) Field of Classification Search
None
See application file for complete search history.

(56) References Cited

U.S. PATENT DOCUMENTS

| 6,139,434 | A  | * | 10/2000 | Miyamoto | G06T 15/10 |
| | | | | | 463/32 |
| 6,155,926 | A  | * | 12/2000 | Miyamoto | G06F 3/038 |
| | | | | | 463/32 |
| 6,283,857 | B1 | * | 9/2001 | Miyamoto | A63F 13/5252 |
| | | | | | 463/31 |
| 6,377,277 | B1 | * | 4/2002 | Yamamoto | A63F 13/57 |
| | | | | | 345/629 |
| 8,602,888 | B2 | * | 12/2013 | Kaneko | A63F 13/40 |
| | | | | | 463/32 |
| 8,753,205 | B2 | * | 6/2014 | Kando | G06F 3/04815 |
| | | | | | 463/31 |
| 9,446,303 | B2 | * | 9/2016 | Shikata | A63F 13/00 |
| 10,410,418 | B2 | * | 9/2019 | Kiuchi | G06T 19/006 |

(Continued)

FOREIGN PATENT DOCUMENTS

JP 2002-360920 12/2002
JP 2009011567 A 1/2009
(Continued)

*Primary Examiner* — Seng H Lim
(74) *Attorney, Agent, or Firm* — Nixon & Vanderhye PC

(57) ABSTRACT

When an object of interest is hidden by a first hiding object as viewed from a virtual camera, the virtual camera is moved, on a virtual line from the virtual camera toward the object of interest, to a first position that is a position where the virtual line first passes through the first hiding object or a position closer to the object of interest than this position. When the virtual camera is moved to the first position, if at least a part of the object of interest is further hidden by a second hiding object, the virtual camera is not moved to a second position that is a position where the virtual line first passes through the second hiding object or a position closer to the object of interest than this position, until a re-movement condition is satisfied.

20 Claims, 15 Drawing Sheets

(56) References Cited

U.S. PATENT DOCUMENTS

| | | | |
|---|---|---|---|
| 10,709,979 B2* | 7/2020 | Johnston | A63F 13/25 |
| 11,508,116 B2* | 11/2022 | Myhill | G06T 15/06 |
| 2003/0107647 A1* | 6/2003 | James | H04N 7/18 |
| | | | 382/104 |
| 2003/0166413 A1* | 9/2003 | Hayashida | G06T 15/405 |
| | | | 463/30 |
| 2006/0046844 A1* | 3/2006 | Kaneko | A63F 13/40 |
| | | | 463/32 |
| 2009/0104990 A1 | 4/2009 | Tsujino et al. | |
| 2009/0163274 A1* | 6/2009 | Kando | A63F 13/577 |
| | | | 463/31 |
| 2014/0354687 A1* | 12/2014 | Kiuchi | A63F 13/525 |
| | | | 345/633 |
| 2014/0357358 A1 | 12/2014 | Shikata et al. | |
| 2018/0104591 A1* | 4/2018 | Fukuda | G06F 3/0488 |
| 2018/0197334 A1* | 7/2018 | Kitazono | A63F 13/56 |
| 2018/0276874 A1* | 9/2018 | Myhill | G06T 15/20 |
| 2021/0038985 A1 | 2/2021 | Stebbins | |
| 2021/0275922 A1* | 9/2021 | Starich | A63F 13/335 |

FOREIGN PATENT DOCUMENTS

| | | |
|---|---|---|
| JP | 2009-056181 | 3/2009 |
| JP | 2014-184300 | 10/2014 |
| JP | 2014-235538 | 12/2014 |
| JP | 2014-235596 | 12/2014 |
| JP | 2018-064753 | 4/2018 |
| JP | 2018-112789 | 7/2018 |
| WO | 2021/025709 | 2/2021 |

* cited by examiner

FIG. 4

FIRST PORTION

COMPUTER-READABLE NON-TRANSITORY STORAGE MEDIUM, INFORMATION PROCESSING APPARATUS, INFORMATION PROCESSING SYSTEM, AND INFORMATION PROCESSING METHOD

CROSS REFERENCE TO RELATED APPLICATION

This application claims priority to Japanese Patent Application No. 2022-094433 filed on Jun. 10, 2022, the entire contents of which are incorporated herein by reference.

FIELD

The present disclosure relates to information processing of controlling movement of a virtual camera.

BACKGROUND AND SUMMARY

Hitherto, a technology in which when an obstacle is present between a virtual camera and a player character and the player character is hidden as viewed from the virtual camera, the virtual camera is moved to a position closer to the player character than the obstacle, has been known.

In the above technology, when there are a plurality of obstacles between the virtual camera and the player character (which overlap and hide the player character), the virtual camera is moved to a position at which the player character is not hidden, such that the virtual camera crosses all of these obstacles at one time.

However, as a result of the above movement, the viewpoint position changes rapidly, and as a result, an image from the virtual camera also changes rapidly in some cases. Therefore, visibility may decrease.

Therefore, an object of the present disclosure is to provide a computer-readable non-transitory storage medium, an information processing apparatus, an information processing system, and an information processing method that can control a virtual camera while reducing a decrease in visibility when a plurality of hiding objects are present in the line-of-sight direction of the virtual camera.

In order to attain the object described above, for example, the following configuration examples are exemplified.

(Configuration 1)

Configuration 1 is Directed to a Computer-Readable Non-Transitory Storage Medium Having Stored Therein Instructions that, when Executed by a Computer of an Information Processing Apparatus, Cause the Computer of the Information Processing Apparatus to:

determine whether or not at least a part of an object of interest is hidden by a first hiding object as viewed from a virtual camera configured to take an image of the object of interest in a virtual space;

move the virtual camera, on a virtual line from the virtual camera toward the object of interest, to a first position that is a position where the virtual line first passes through the first hiding object or a position closer to the object of interest than the position where the virtual line first passes through the first hiding object, on the basis of at least a part of the object of interest being determined to be hidden by the first hiding object; and when the virtual camera is moved to the first position, if at least a part of the object of interest is further hidden by a second hiding object, not move the virtual camera to a second position that is a position where the virtual line first passes through the second hiding object or a position closer to the object of interest than the position where the virtual line first passes through the second hiding object, while a re-movement condition is not satisfied, and move the virtual camera to the second position when the re-movement condition is satisfied.

According to the above configuration, when a plurality of hiding objects that hide the object of interest are present in the line-of-sight direction of the virtual camera, the virtual camera is moved to a position at which the object of interest is not hidden. At this time, the virtual camera is not moved so as to cross these hiding objects at one time, but is moved so as to cross the plurality of hiding objects one by one by performing determination for the re-movement condition. Accordingly, a rapid change in viewpoint position in a very short time can be suppressed, and a decrease in the visibility of the user can be reduced.

(Configuration 2)

According to Configuration 2, in Configuration 1 described above, when the virtual camera comes into contact with or becomes buried in the first hiding object, the virtual camera may be moved to the first position.

According to the above configuration, until the virtual camera comes into contact with or becomes buried in the hiding object, the virtual camera is not moved to the first position. Therefore, the virtual camera can be inhibited from moving to the first position even when the virtual camera is not in contact with the hiding object, so that the virtual camera can be prevented from frequently slipping through the hiding object (terrain object).

(Configuration 3)

According to Configuration 3, in Configuration 1 or 2 described above, when the virtual camera comes into contact with or becomes buried in the second hiding object, it is determined that the re-movement condition is satisfied, and the virtual camera may be moved to the second position.

According to the above configuration, the condition for the virtual camera to move to a position beyond the hiding object is common to the first hiding object and the second hiding object. Therefore, it is made easier for the user to grasp the behavior of the virtual camera, for example, "when the virtual camera hits a wall, the virtual camera slips past the wall".

(Configuration 4)

According to Configuration 4, in any one of Configurations 1 to 3 described above, when a predetermined time elapses from a timing when the virtual camera is moved to the first position, it may be determined that the re-movement condition is satisfied.

According to the above configuration, after the virtual camera moves to the first position, the virtual camera is not moved to the second position until the predetermined time elapses. Therefore, rapid movement of the virtual camera in a short time can be suppressed, and a decrease in visibility can be reduced.

(Configuration 5)

According to Configuration 5, in any one of Configurations 1 to 3 described above, when the virtual camera moves for a predetermined distance or more from a timing when the virtual camera is moved to the first position, it may be determined that the re-movement condition is satisfied.

According to the above configuration, the virtual camera is not moved to the second position until the virtual camera moves from the first position for the predetermined distance or more. Therefore, rapid movement of the virtual camera in a short time can be suppressed.

(Configuration 6)

According to Configuration 6, in any one of Configurations 1 to 5 described above, the virtual camera may be controlled such that a distance between the virtual camera and the object of interest is shortened as a depression angle of the virtual camera decreases.

According to the above configuration, the distance between the virtual camera and the object of interest decreases as the depression angle of the virtual camera decreases. Therefore, there are more opportunities for the virtual camera to move to the first position, for example, due to contact with a hiding object such a wall extending in the vertical direction. In such a case as well, a rapid change in viewpoint can be suppressed.

(Configuration 7)

According to Configuration 7, in any one of Configurations 1 to 6 described above, at least either one of a position and an orientation of the virtual camera may be controlled on the basis of a camera control input by a user.

According to the above configuration, the user can directly operate the virtual camera, so that it can be made easier to grasp the state in the virtual space and the convenience of the user can be improved.

(Configuration 8)

According to Configuration 8, in any one of Configurations 1 to 7 described above, the object of interest may be a player character.

According to the above configuration, a decrease in visibility can be reduced, so that it is made easier for the user to grasp the positional relationship in the virtual space for the player character to be operated by the user.

(Configuration 9)

According to Configuration 9, in Configuration 8 described above, when at least a part of the object of interest is hidden by the hiding object as viewed from the virtual camera, at least the part of the object of interest may be rendered so as to be viewable through the hiding object.

According to the above configuration, even when the object of interest is hidden by a hiding object, the user is allowed to grasp the position of the object of interest.

(Configuration 10)

According to Configuration 10, in any one of Configurations 1 to 9 described above, the virtual camera may be moved and an orientation of the virtual camera may be changed with the object of interest as a gazing point of the virtual camera.

According to the above configuration, even when the object of interest moves, the virtual camera can be controlled such that the object of interest is always captured by the virtual camera.

(Configuration 11)

Configuration 11 is directed to a computer-readable non-transitory storage medium having stored therein instructions that, when executed by a computer of an information processing apparatus, cause the computer of the information processing apparatus to:

determine whether or not a virtual camera is in contact with or buried in a hiding object;

move the virtual camera closer to an object of interest such that the first hiding object is not captured by the virtual camera, on the basis of the virtual camera being determined to be in contact with or buried in the first hiding object; and when the virtual camera is moved closer to the object of interest such that the first hiding object is not captured by the virtual camera, even if at least a part of the object of interest is further hidden by another hiding object, when the virtual camera is not in contact with or buried in the other hiding object, not move the virtual camera closer to the object of interest such that the other hiding object is not captured by the virtual camera.

According to the above configuration, when a plurality of hiding objects are present in the line-of-sight direction of the virtual camera, movement control is performed such that the virtual camera sequentially crosses the plurality of hiding objects one by one. Accordingly, a rapid change in viewpoint position can be suppressed, and a decrease in the visibility of the user can be reduced.

According to the exemplary embodiments, it is possible to improve visibility in the case where a plurality of hiding objects are present in the line-of-sight direction of the virtual camera.

BRIEF DESCRIPTION OF THE DRAWINGS

FIG. 4 is six orthogonal views showing a non-limiting example of the left controller 3;

DETAILED DESCRIPTION OF NON-LIMITING EXAMPLE EMBODIMENTS

Hereinafter, one exemplary embodiment will be described.

A game system according to an example of the exemplary embodiment will be described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment will be described, and then, the control of the game system 1 according to the exemplary embodiment will be described.

Figure 1:
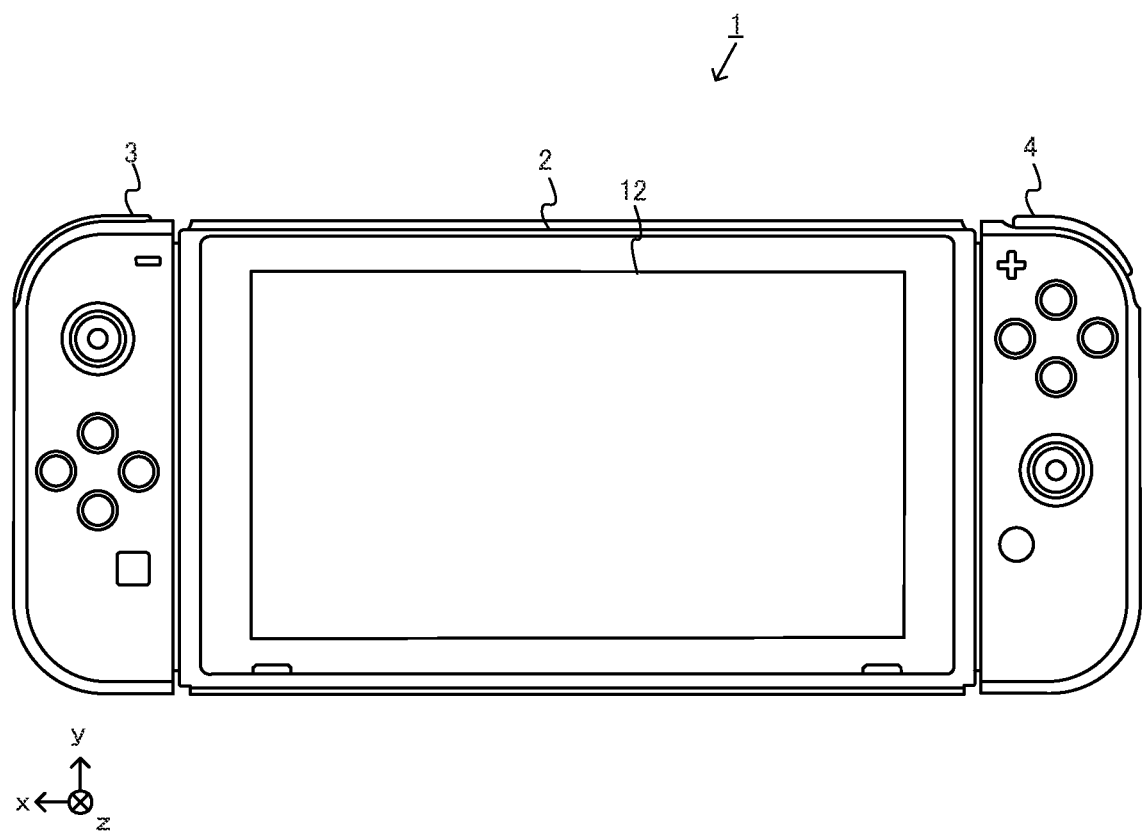
FIG. 1 shows a non-limiting example of a state in which a left controller 3 and a right controller 4 are attached to a main body apparatus 2.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
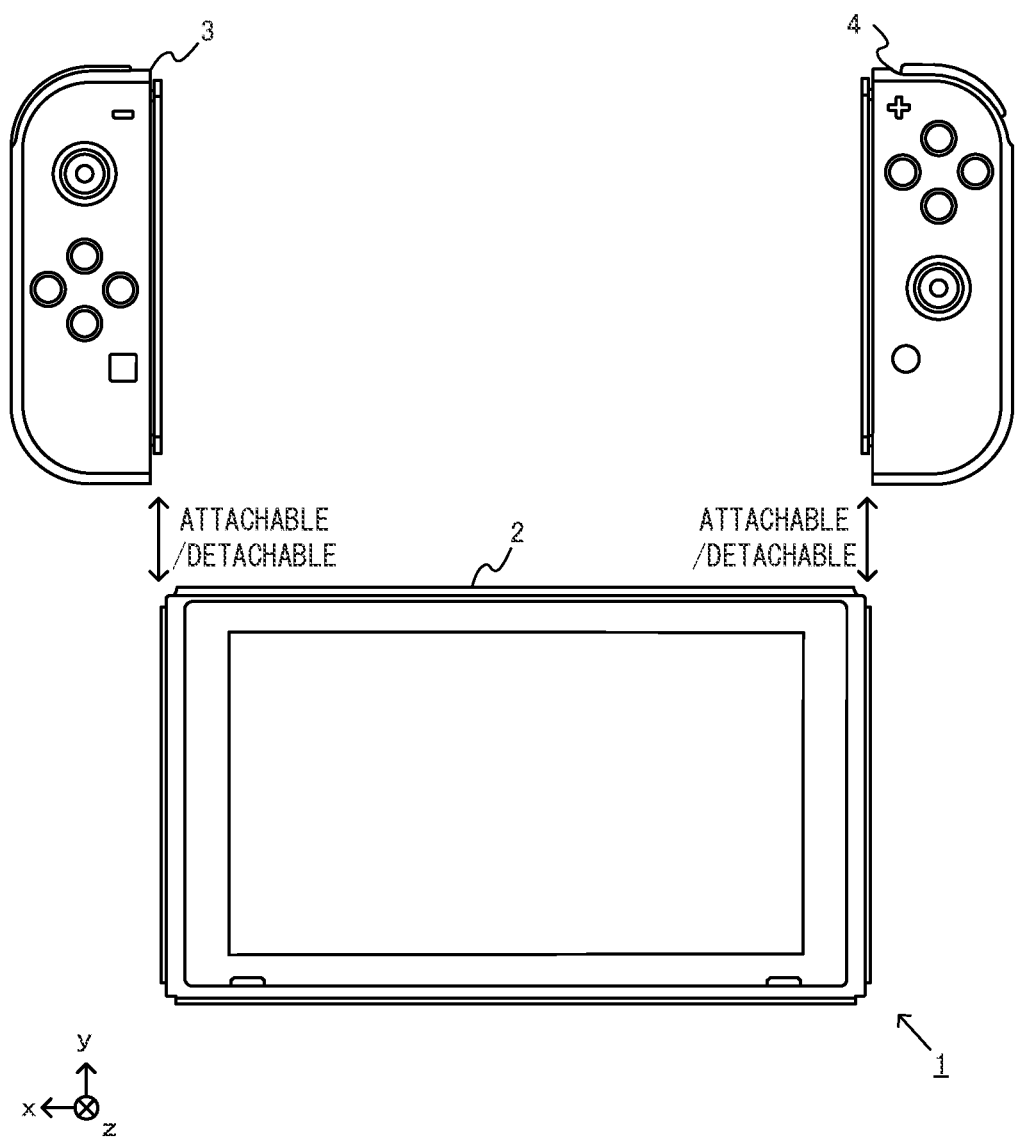
FIG. 2 shows a non-limiting example of a state in which the left controller 3 and the right controller 4 are detached from the main body apparatus 2.

FIG. 2 shows an example of the state where each of the left controller 3 and the right controller 4 is detached from the main body apparatus 2. As shown in FIGS. 1 and 2, the left controller 3 and the right controller 4 are attachable to and detachable from the main body apparatus 2. Hereinafter, the left controller 3 and the right controller 4 may be collectively referred to as "controller".

Figure 3:
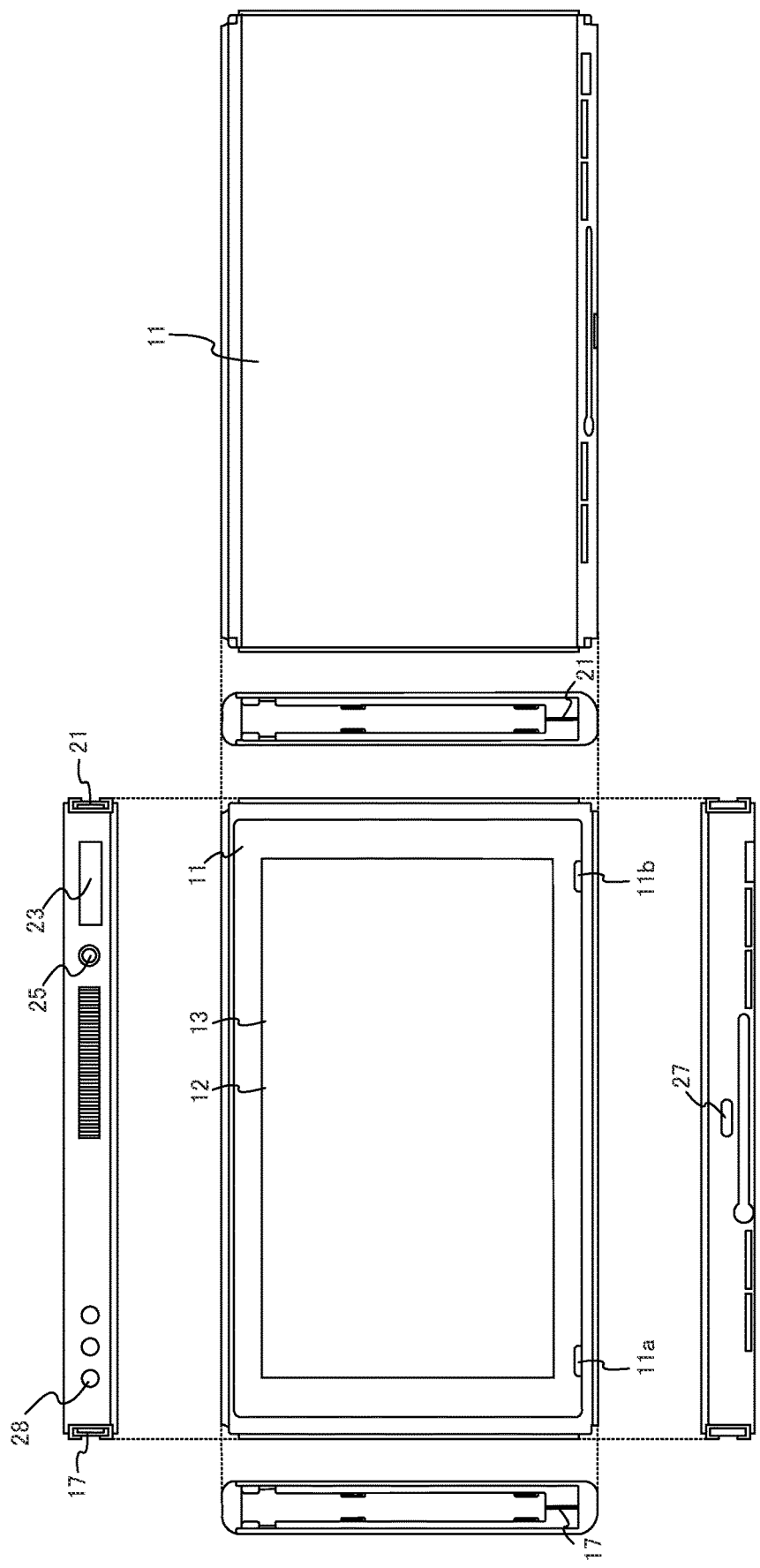
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a substantially rectangular shape.

The shape and the size of the housing 11 are discretionary. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type. The main body apparatus 2 includes a touch panel 13 on the screen of the display 12. In the exemplary embodiment, the touch panel 13 is of a type capable of receiving a multi-touch input (e.g., electrical capacitance type). However, the touch panel 13 may be of any type, and may be, for example, of a type capable of receiving a single-touch input (e.g., resistive film type).

The main body apparatus 2 includes speakers (i.e., speakers 88 shown in FIG. 6) within the housing 11. As shown in FIG. 3, speaker holes 11a and 11b are formed in the main surface of the housing 11. Then, sounds outputted from the speakers 88 are outputted through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided at an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and outputted from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
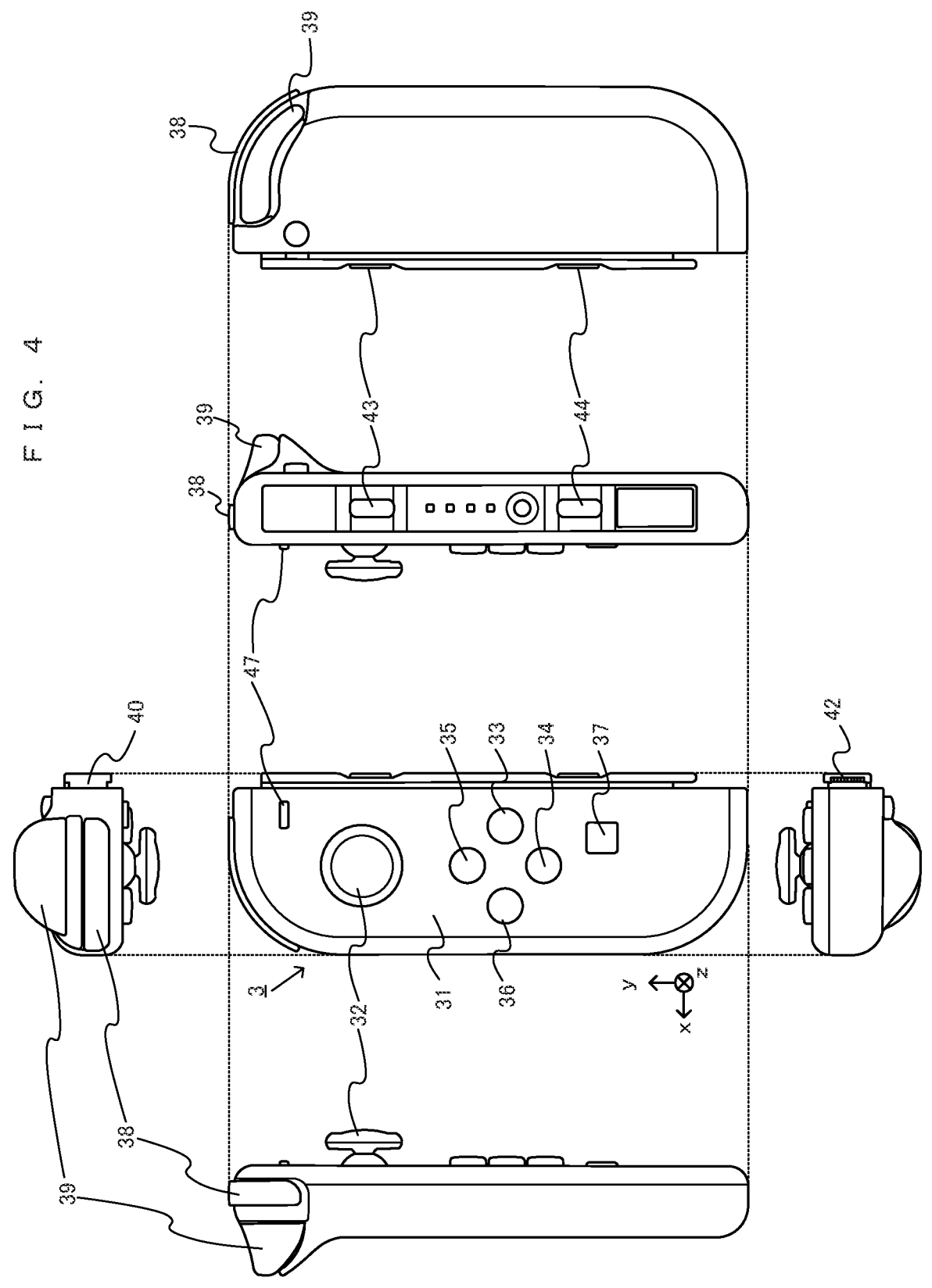

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction shown in FIG. 4 (i.e., a z-axis direction shown in FIG. 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly, the left hand. Further, the left controller 3 can also be held in the orientation in which the left controller 3 is horizontally long. When held in the orientation in which the left controller 3 is horizontally long, the left controller 3 may be held with both hands.

The left controller 3 includes a left analog stick (hereinafter, referred to as a "left stick") 32 as an example of a direction input device. As shown in FIG. 4, the left stick 32 is provided on a main surface of the housing 31. The left stick 32 can be used as a direction input section with which a direction can be inputted. The user tilts the left stick 32 and thereby can input a direction corresponding to the direction of the tilt (and input a magnitude corresponding to the angle of the tilt). The left controller 3 may include a directional pad, a slide stick that allows a slide input, or the like as the direction input section, instead of the analog stick. Further, in the exemplary embodiment, it is possible to provide an input by pressing the left stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "—" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
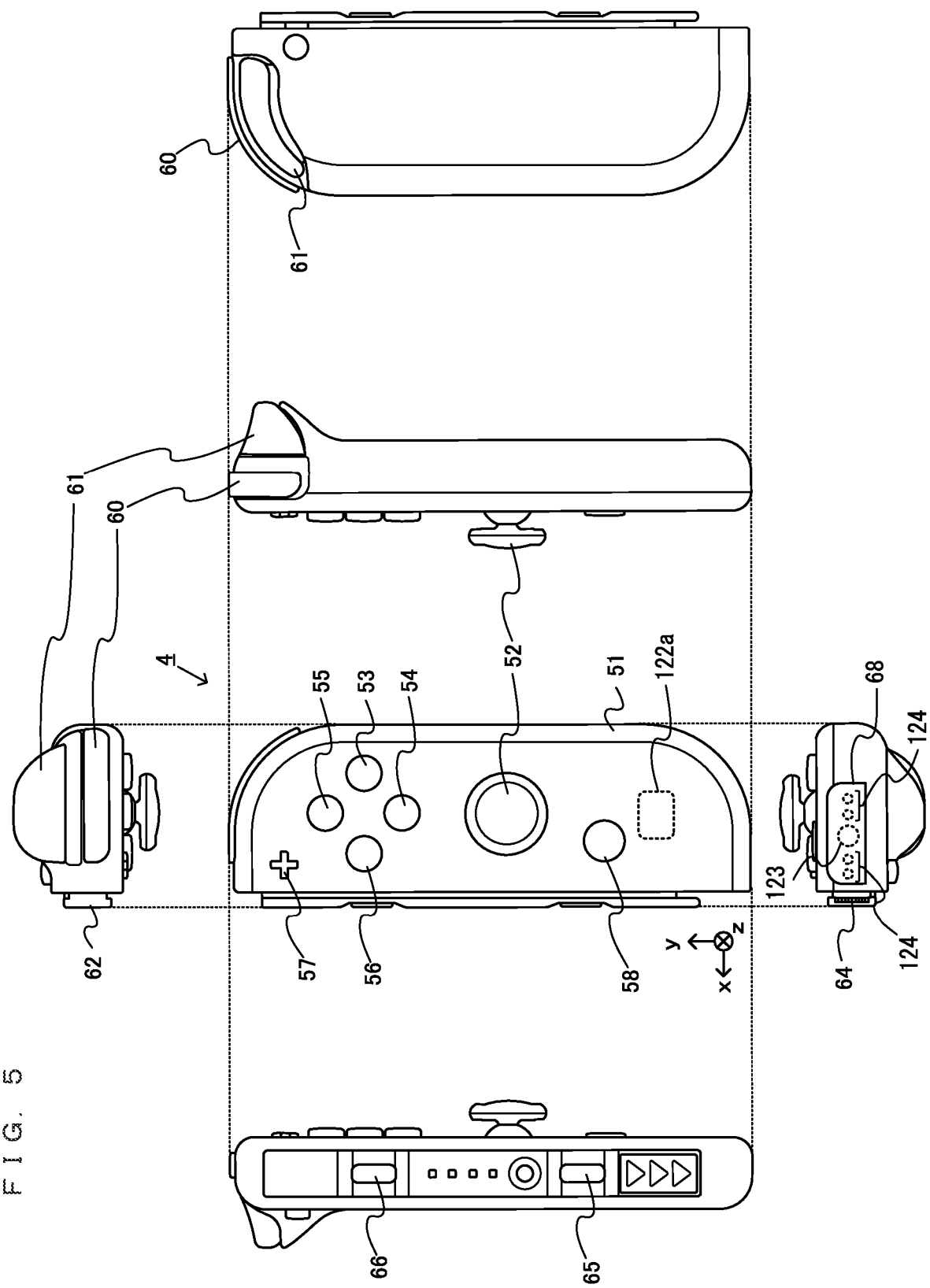
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction shown in FIG. 5 (i.e., the z-axis direction shown in FIG. 5). In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes a right analog stick (hereinafter, referred to as a "right stick") 52 as a direction input section. In the exemplary embodiment, the right stick 52 has the same configuration as that of the left stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
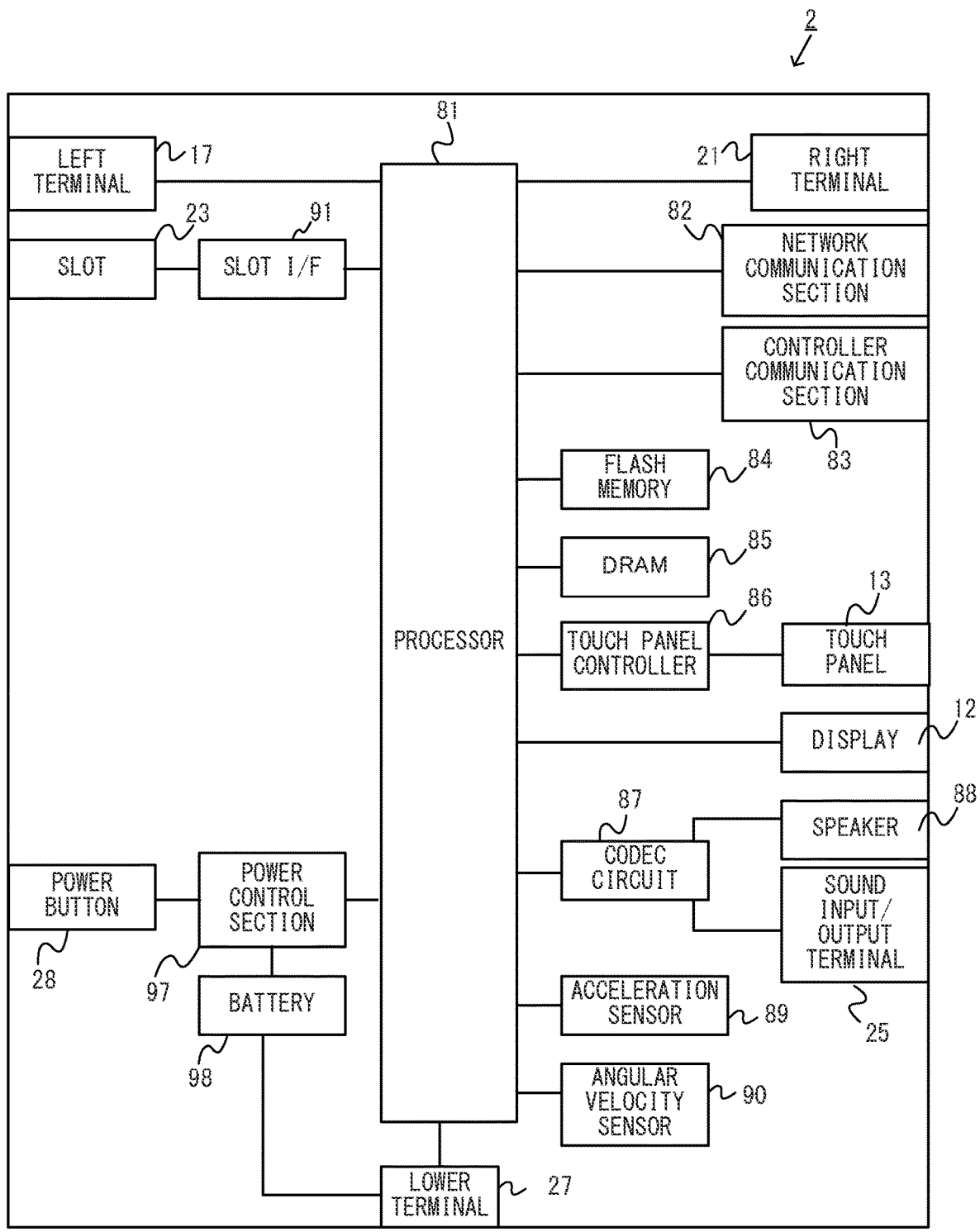
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and housed in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined method for communication (e.g., communication based on a unique protocol or infrared light communication). The wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2, and the left controller 3 and the right controller 4, is discretionary. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Further, the battery 98 is connected to the lower terminal 27. When an external charging device (e.g., the cradle) is connected to the lower terminal 27 and power is supplied to the main body apparatus 2 via the lower terminal 27, the battery 98 is charged with the supplied power.

Figure 7:
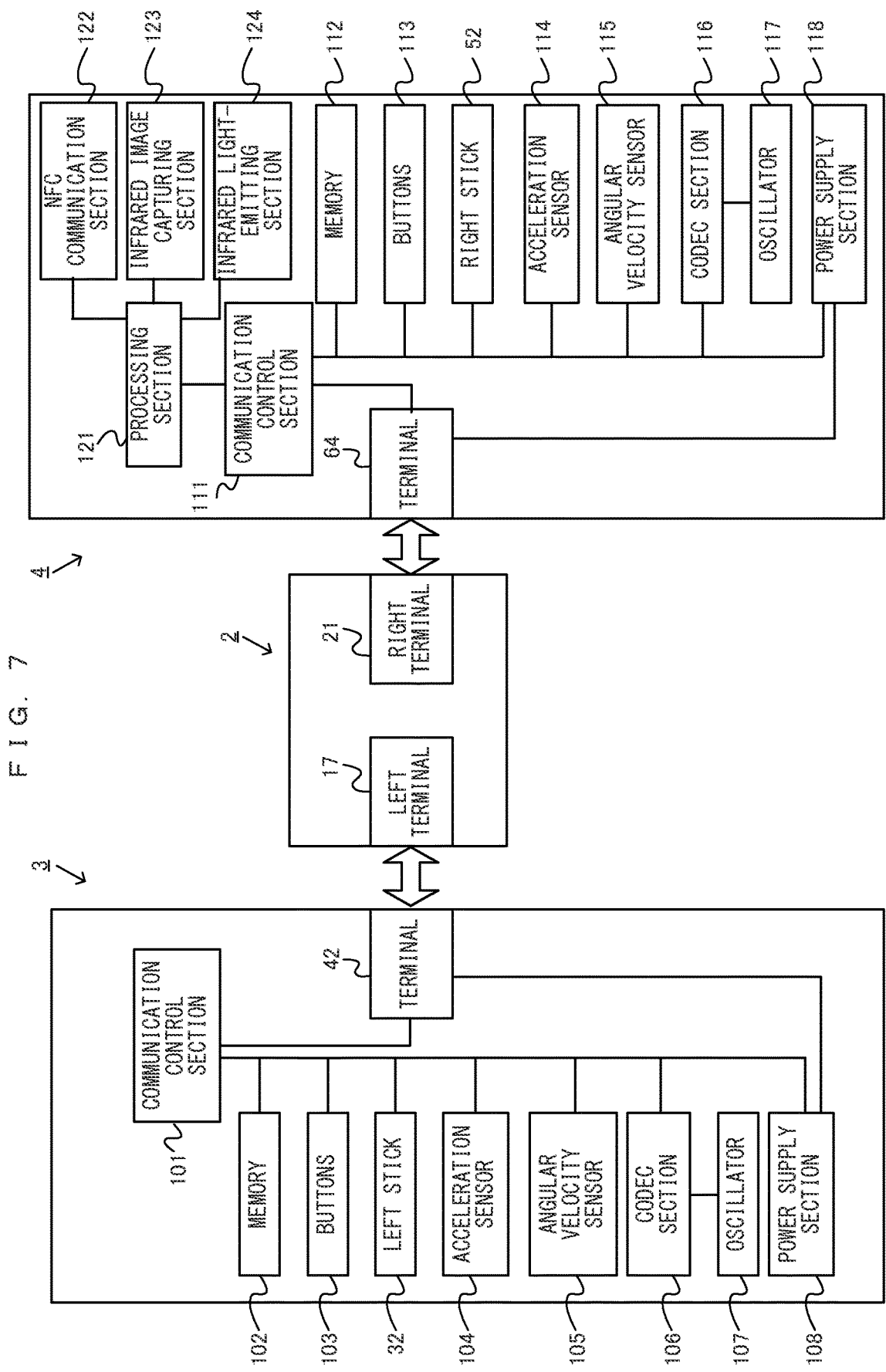
FIG. 7 is a block diagram showing non-limiting examples of the internal configurations of the main body apparatus 2, the left controller 3, and the right controller 4.

FIG. 7 is a block diagram showing examples of the internal configurations of the main body apparatus 2, the left controller 3, and the right controller 4. The details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., x, y, z axes shown in FIG. 4) directions. The acceleration sensor 104 may detect an acceleration along one axial direction or accelerations along two axial directions. In the exemplary embodiment, the angular velocity sensor 105 detects angular velocities about predetermined three axes (e.g., the x, y, z axes shown in FIG. 4). The angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. The operation data is transmitted repeatedly, once every predetermined time. The interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 on the basis of the operation data. Further, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[Outline of Information Processing in Exemplary Embodiment]

Next, an outline of operation of the information processing executed by the game system 1 according to the exemplary embodiment will be described. The processing according to the exemplary embodiment is processing related to control of the virtual camera. Specifically, the processing according to the exemplary embodiment is processing that assumes the case where an object of interest is hidden by a predetermined object (hereinafter, hiding object) as viewed from the virtual camera. In the exemplary embodiment, a description will be given with the case where the object of interest is a player character object (hereinafter, referred to as PC) as an example.

[Outline of Processing and Screen Examples]

Figure 8:
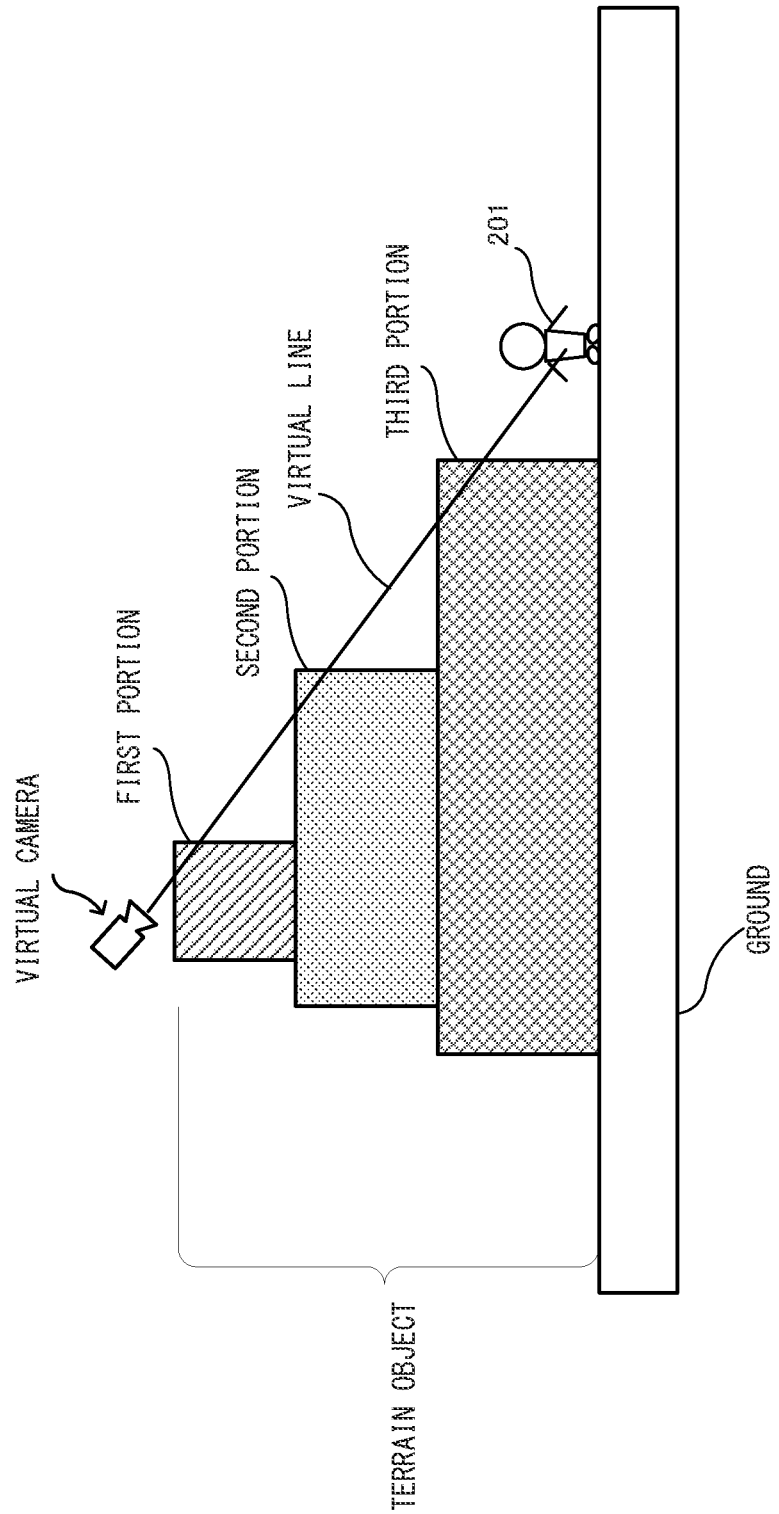
FIG. 8 illustrates an outline of processing according to an exemplary embodiment.
Figure 9:
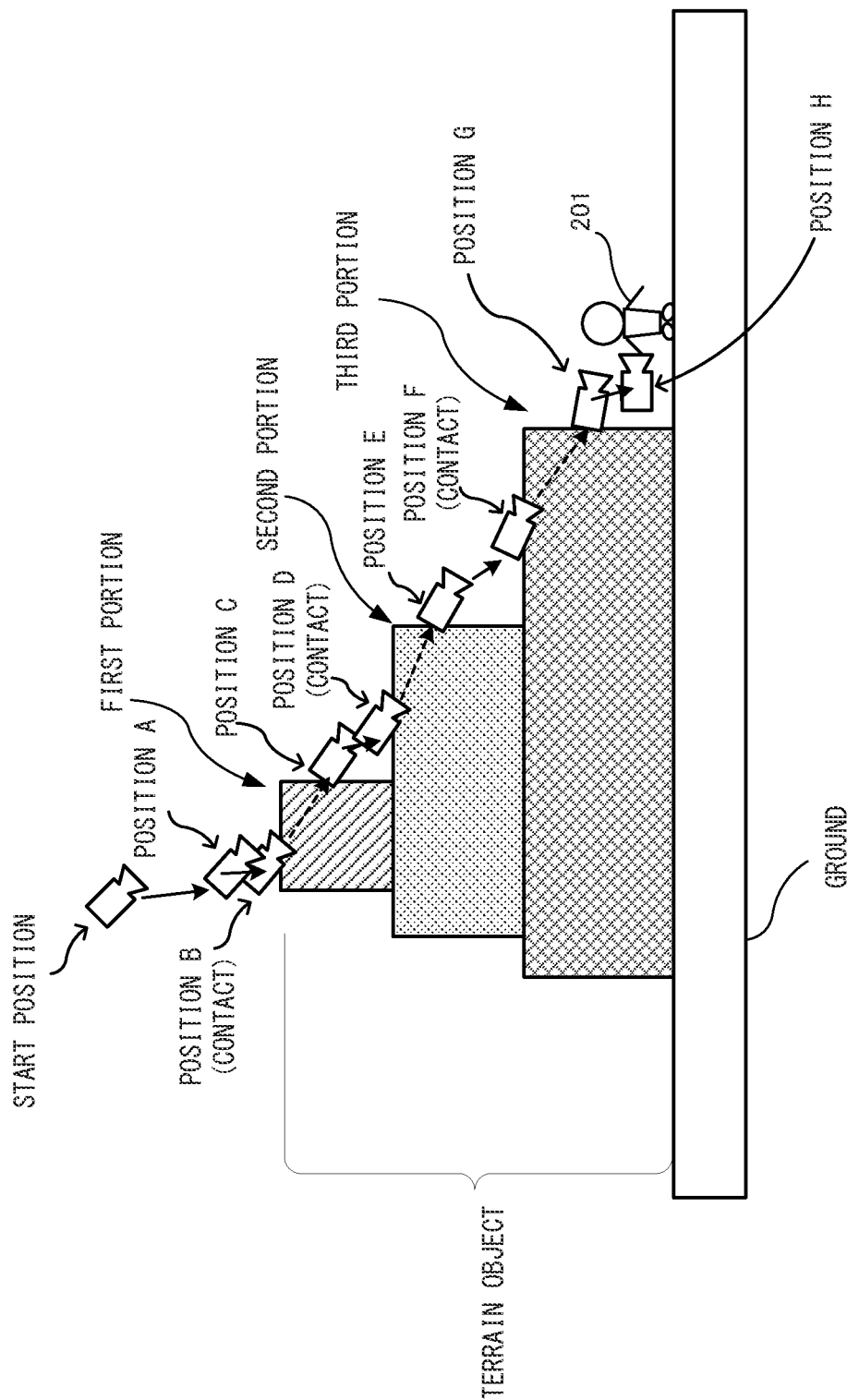
FIG. 9 illustrates the outline of the processing according to the exemplary embodiment.

FIG. 8 and FIG. 9 illustrate an outline of the processing according to the exemplary embodiment, and also show the positional relationship between the virtual camera, a PC 201, and a terrain object that can be the above hiding object. FIG. 10 to FIG. 15 each show one example of a screen displayed by the processing of the exemplary embodiment. FIG. 8 and FIG. 9 are each a schematic diagram showing an image of a cross-sectional view, of a terrain as shown in FIG. 10 to FIG. 15, taken along a vertical plane passing through the virtual camera and the PC 201. First, the positional relationship will be described with reference to FIG. 8. In FIG. 8, the PC 201 is placed on the ground in a virtual three-dimensional space (hereinafter, referred to simply as virtual space). In addition, the terrain object is placed on the left side of the PC 201 in FIG. 8. The terrain object has three steps and has substantially a stair shape. Hereinafter, for convenience of description, portions relevant to the respective steps are referred to as first portion, second portion, and third portion as shown in FIG. 8. Specifically, in FIG. 8, when a virtual line (line of sight of the virtual camera) from the virtual camera toward the PC 201 passes through the terrain object (is positioned outside the terrain object, positioned inside the terrain object, and positioned outside the terrain object) a plurality of times, portions of the terrain object through which the virtual line passes are referred to as first portion, second portion, and third portion in order from the portion closer to the virtual camera. Also, in the following description, each portion is treated as an individual hiding object. Moreover, these portions are sometimes collectively referred to as "hiding portion". The terrain object may be one object including these hiding portions, or may be composed of a combination of hiding portions that are separate objects. In addition, in FIG. 8 to FIG. 15, each of the three steps is shown with a different shading pattern to make it easier to distinguish each step (height difference therebetween).

An outline of virtual camera control processing in the exemplary embodiment will be described on the assumption of the positional relationship between the PC 201 and the terrain object having the above shape. In the exemplary embodiment, the gazing point of the virtual camera is set at the PC 201. The case where, when the PC 201 is hidden by the terrain object (the nearest hiding portion) and cannot be seen as viewed from the virtual camera, the virtual camera is moved to a position at which the PC 201 is not hidden and can be seen, is assumed.

Here, as supplementary description regarding the movement of the virtual camera, the case of moving the virtual camera on the basis of an operation of the user is assumed in the exemplary embodiment. Specifically, the user can change a depression angle of the virtual camera, for example, using the right stick 52. Then, the distance from the virtual camera to the PC 201 is determined on the basis of the depression angle. In the exemplary embodiment, when the depression angle of the virtual camera is larger, the distance from the PC 201 is larger. Therefore, when the user performs an operation for increasing the depression angle of the virtual camera (e.g., an inputting operation of tilting the right stick 52 upward), the depression angle of the virtual camera increases, and the virtual camera moves away from the PC 201 (moves backward). On the other hand, when the user performs an operation for decreasing the depression angle of the virtual camera (e.g., an inputting operation of tilting the right stick 52 downward), the depression angle can be decreased. As the depression angle decreases, the distance between the virtual camera and the PC 201 decreases. As a result, the user can move the virtual camera by this operation such that the virtual camera comes closer to the ground and the PC 201.

The processing according to the exemplary embodiment is also applicable to the case of automatically controlling the virtual camera such as moving the virtual camera so as to follow the PC 201.

Figure 10:
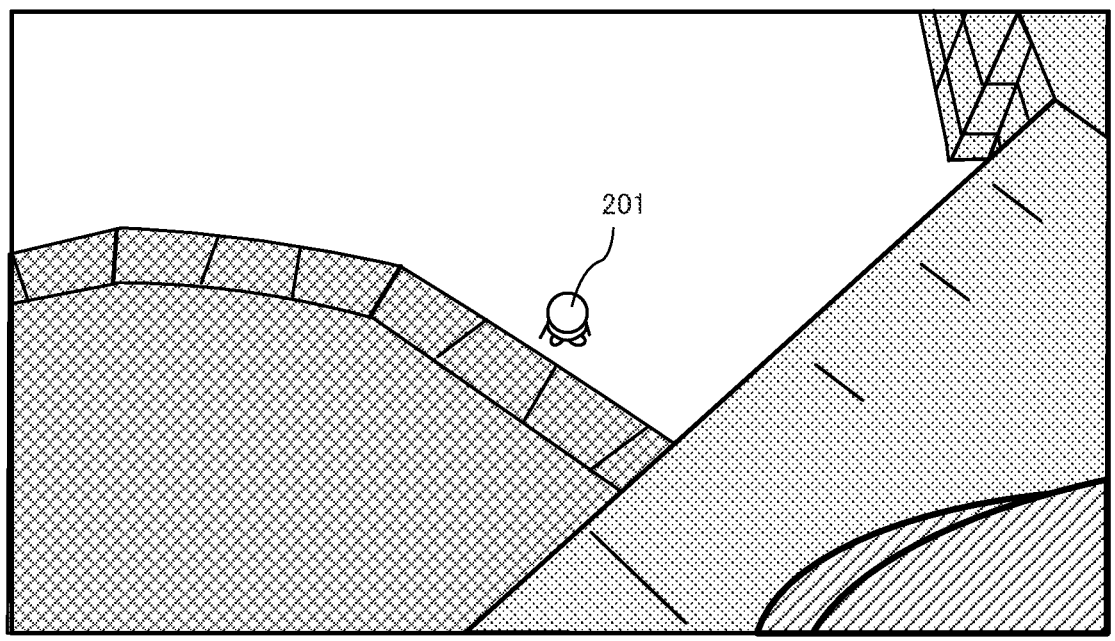
FIG. 10 shows a non-limiting example of a game screen according to the exemplary embodiment.

Next, an example of the movement of the virtual camera in the exemplary embodiment will be described. Specifically, a description will be given with the case where, from a state where the virtual camera is located at a "start position" shown in FIG. 9, the virtual camera finally moves to a "position H", as an example. First, when the virtual camera is located at the "start position", a screen is displayed as shown in FIG. 10. FIG. 10 shows a state where the PC 201 is not hidden as viewed from the virtual camera. Also, in FIG. 10, a portion corresponding to a step of the terrain object is partially seen in the screen.

Figure 11:
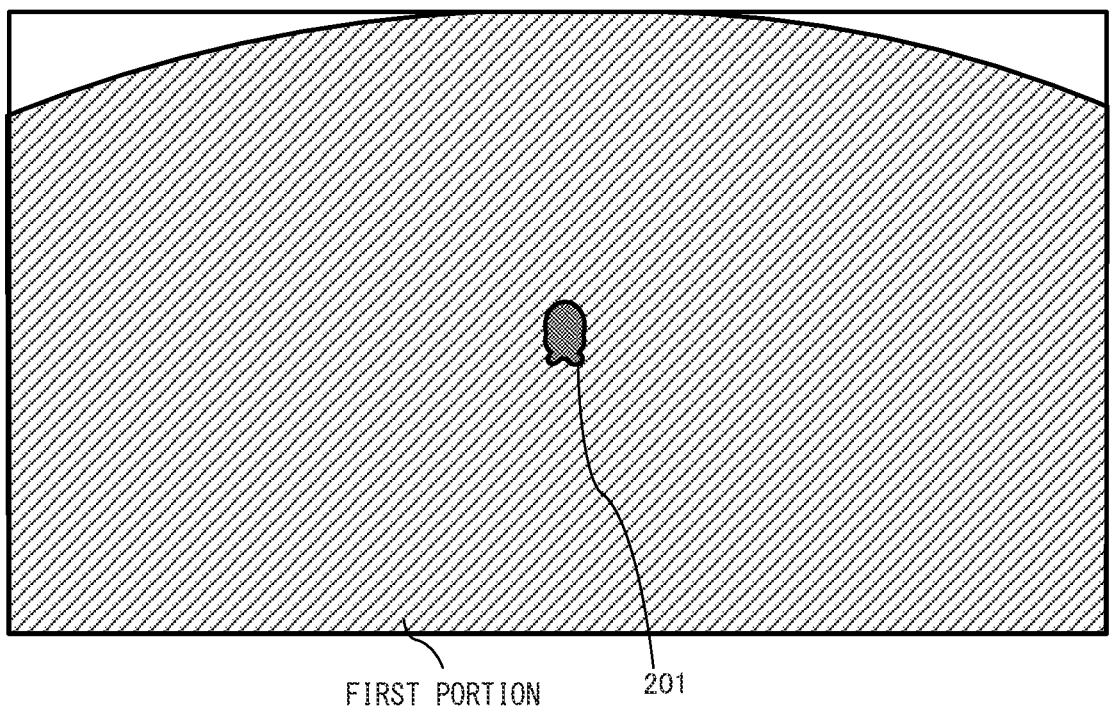
FIG. 11 shows a non-limiting example of the game screen according to the exemplary embodiment.
Figure 12:
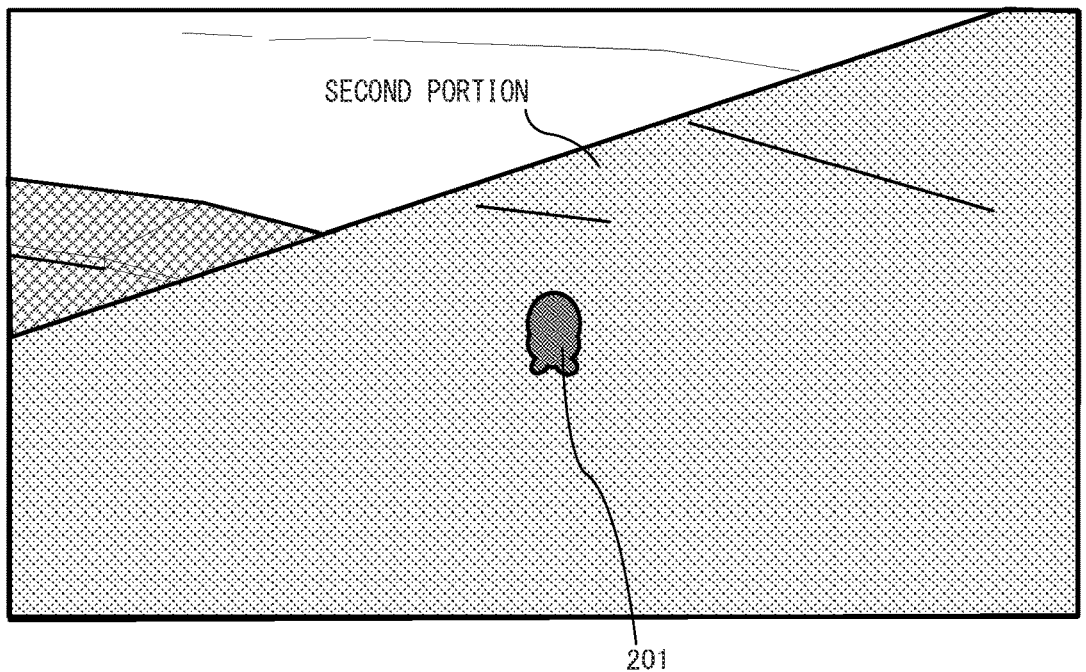
FIG. 12 shows a non-limiting example of the game screen according to the exemplary embodiment.

Next, in FIG. 9 above, the case where the virtual camera has moved down a little from the "start position" to a "position A" is assumed. Also, FIG. 11 shows an example of a screen when the virtual camera is located at the "position A". At the "position A", a positional relationship in which the virtual camera is not in contact with the terrain object but the above three portions are present on the line of sight of the virtual camera, is established (see FIG. 8 above). That is, the first portion, the second portion, and the third portion are present on the virtual line. Therefore, the PC 201 is hidden by the first portion as viewed from the virtual camera. In the screen example in FIG. 11 above, most of the screen is covered with the first portion which is located closest to the virtual camera.

As shown in FIG. 11, in the exemplary embodiment, the PC 201 is displayed as a silhouette when the PC 201 is hidden as viewed from the virtual camera. Accordingly, the user is allowed to visually recognize (grasp) the position of the hidden PC 201. When only a part of the PC 201 is hidden, only the hidden part may be displayed as a silhouette.

As described above, at the "position A", the three hiding portions are present on the virtual line. The case where the virtual camera then further moves down and comes into contact with the first portion is assumed. In this case, if moving the virtual camera to a position at which the PC 201 is not hidden is considered, in the conventional art, generally, the virtual camera is moved in an instant or in a very short time to a "position G" (or the "position H"), at which the PC 201 is not hidden, so as to slip through the plurality of hiding portions at one time (cross the hiding portions at one time). However, in the case of such control, a change in the image is rapid, and visibility may decrease. For example, if the distance for which the virtual camera moves in an instant is long to some extent, such a rapid change in viewpoint position may make it difficult for the user to grasp a positional relationship in the virtual space.

Therefore, in the exemplary embodiment, when a plurality of hiding portions are present on the line of sight from the virtual camera to the object of interest and the virtual camera is moved to a position at which the object of interest is not hidden, control in which the virtual camera does not cross the plurality of hiding portions at one time but crosses the hiding portions one by one, is performed. By performing such control in which the virtual camera crosses the hiding portions stepwise, a rapid change in viewpoint position can be suppressed, and a decrease in visibility can be prevented.

Specifically, in the exemplary embodiment, in a state where the PC 201 is hidden, when the virtual camera comes into contact with or becomes buried in a hiding portion (in the following, both are collectively referred to as contact), the virtual camera is caused to pass to a position at which the PC 201 is not hidden by the hiding portion. Hereinafter, such movement of causing the virtual camera to pass through the hiding portion is referred to as "slip-through movement". In addition, the position at which the PC 201 is not hidden by the hiding portion and which is the destination of the slip-through movement is referred to as "slip-through destination position". The slip-through destination position is a position immediately after the virtual line first passes through the first portion, or a position closer to the object of interest than the position immediately after the virtual line first passes through the first portion.

The slip-through destination position will be described in the example in FIG. 9 above. First, as a result of moving from the "position A" to a "position B", the virtual camera comes into contact with the first portion. In this case, a position, on the virtual line from the virtual camera toward the PC 201, immediately after the virtual camera first passes through the first portion is calculated. This position or a position closer to the PC 201 than this position is determined as the above slip-through destination position. In the exemplary embodiment, the case where the latter position is used as the slip-through destination position will be described as an example. More specifically, a position, on the virtual line, that is adjacent to the PC 201 side from the position immediately after the virtual camera passes through the currently contacted hiding portion (first portion in FIG. 8) and at which the hiding portion and the virtual camera are not in contact with each other, is determined as the slip-through destination position.

The virtual camera is moved to the slip-through destination position determined thus, in the example in FIG. 9, a "position C". As for this movement, the virtual camera may be moved in an instant, or may be moved so as to slowly pass through the interior of the first portion. In the former case, a representation in which the virtual camera passes through the first portion in an instant is performed on the screen. In the latter case, a state where the virtual camera passes through the interior of the first portion is displayed on the screen over a short period of time. In addition, in both cases, the distance of the movement is smaller than that in the case where the virtual camera crosses the plurality of hiding portions at one time, so that the difficulty in grasping the positional relationship can be reduced.

When the virtual camera is caused to perform the slip-through movement through the first portion and is located at the "position C" as described above, a screen is displayed as shown in FIG. 12. At this time, two hiding portions (the second portion and the third portion) are still present on the virtual line. Therefore, the displayed screen is a screen in which a part of the second portion is seen on the virtual camera side (near side) and a part of the third portion is seen on the far side. In addition, the PC 201 is still hidden, and thus continues to be displayed as a silhouette.

As described above, at the time when the virtual camera is located at the "position C", the PC 201 is still hidden. Therefore, if the operation for lowering the position of the virtual camera is continued, control of causing the virtual camera to perform the slip-through movement through the second portion is subsequently performed. However, in the exemplary embodiment, after the virtual camera is moved to a first position described later, the virtual camera is not caused to perform the slip-through movement through the second portion, unless a "re-movement condition" is satisfied. That is, control in which after the slip-through movement is performed through one hiding portion, the slip-through movement through the next hiding portion is not performed immediately but is performed after the re-movement condition is satisfied, is performed. In the exemplary embodiment, a description will be given with the following condition as an example of the re-movement condition. The hiding portion that is in contact with the virtual camera before the virtual camera moves to the slip-through destination position is referred to as first hiding object, and the hiding portion closest to the slip-through destination position among the hiding portions on the virtual line is referred to as second hiding object. In the above example, the first portion corresponds to the first hiding object, and the second portion corresponds to the second hiding object. In addition, the slip-through destination position for the first portion is referred to as first position, and the slip-through destination position for the second portion is referred to as second position. The re-movement condition for moving to the second position after moving to the first position is a condition that the virtual camera comes into contact with the second hiding object (second portion). Therefore, the virtual camera moves, for example, in the following manner. First, the virtual camera further moves down from the "position C" to a "position D". As a result, the virtual camera comes into contact with the second portion, which satisfies the above re-movement condition. Then, a "position E" is determined as the slip-through destination position for the second portion. As a result, when the virtual camera comes into contact with the second portion at the "position D", the virtual camera moves so as to perform the slip-through movement from the "position D" to the "position E".

Figure 13:
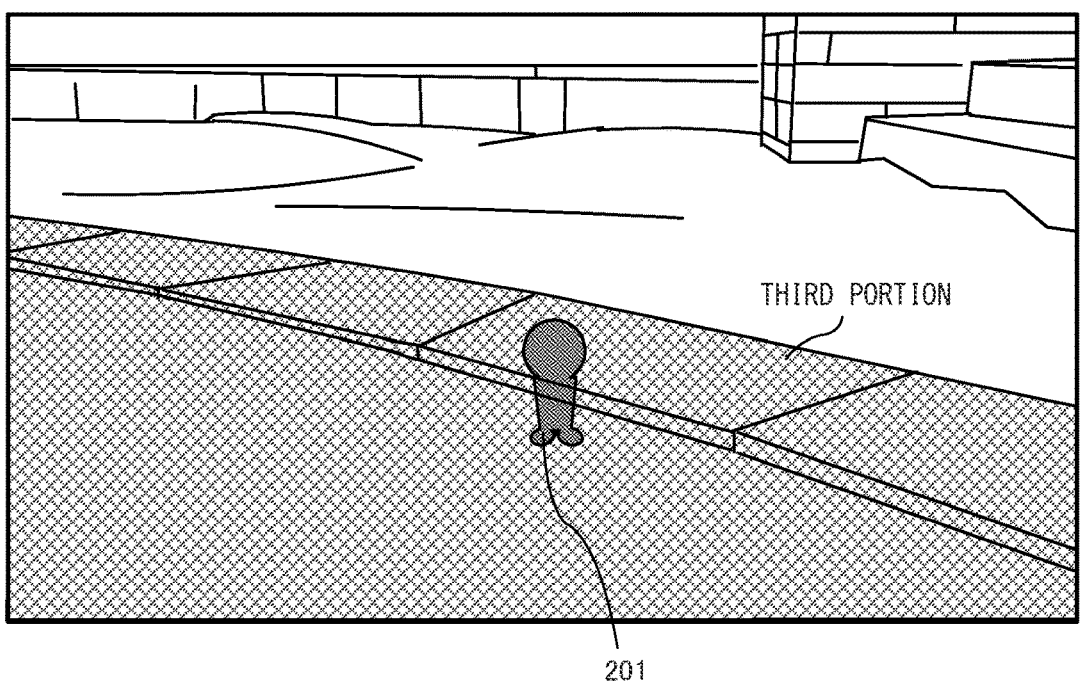
FIG. 13 shows a non-limiting example of the game screen according to the exemplary embodiment.

FIG. 13 shows a screen example in the case where the virtual camera is located at the "position E". This screen shows a state where the PC 201 is still hidden by the third portion. Then, as in the above, on a condition that the re-movement condition is satisfied, control of causing the virtual camera to perform the slip-through movement through the third portion is performed. In this case, the second portion corresponds to the first hiding object, and the third portion corresponds to the second hiding object. In addition, the first position corresponds to the "position E", and the second position corresponds to the "position G". Therefore, the condition for the virtual camera to perform the slip-through movement to the "position G" after moving to the "position E" is a condition that the virtual camera comes into contact with the third portion. Therefore, the virtual camera moves as follows. First, as a result of moving from the "position E" to a "position F", the virtual camera comes into contact with the third portion. Accordingly, the re-movement condition is satisfied, and the "position G" is determined as the slip-through destination position. Then, the virtual camera performs the slip-through movement from the "position F" to the "position G".

Figure 14:
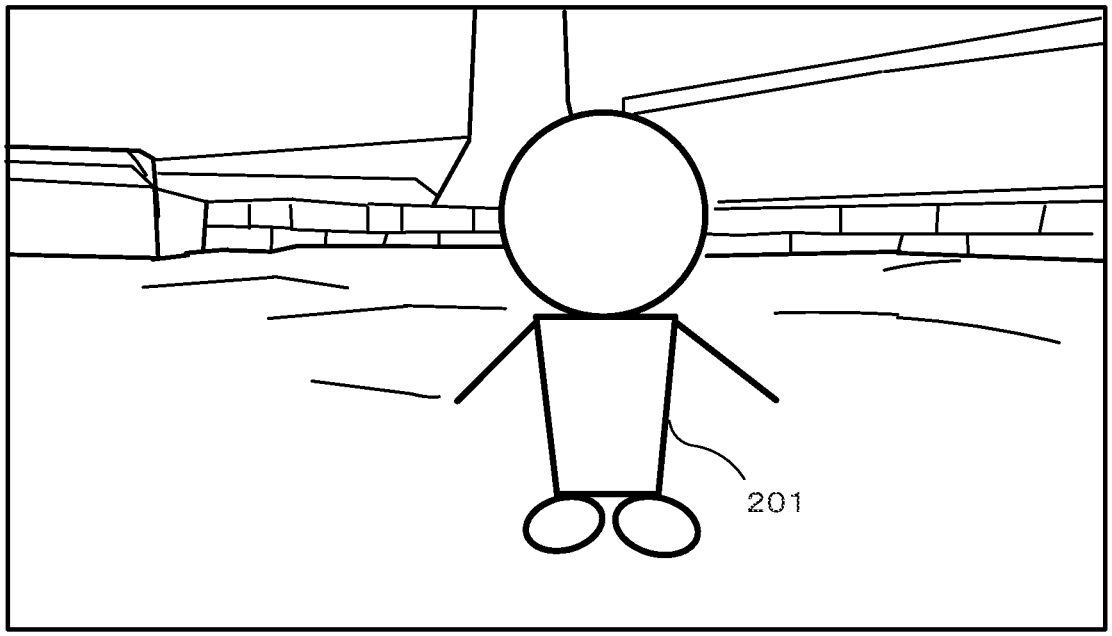
FIG. 14 shows a non-limiting example of the game screen according to the exemplary embodiment.

FIG. 14 shows a screen example when the virtual camera is located at the "position G". At the "position G", no hiding portion (terrain object) that hides the PC 201 is present, and thus the display of the PC 201 as a silhouette is cancelled. In addition, the depression angle of the virtual camera is close to 0 degrees, and a screen in which the line-of-sight direction is close to the horizontal is displayed.

Figure 15:
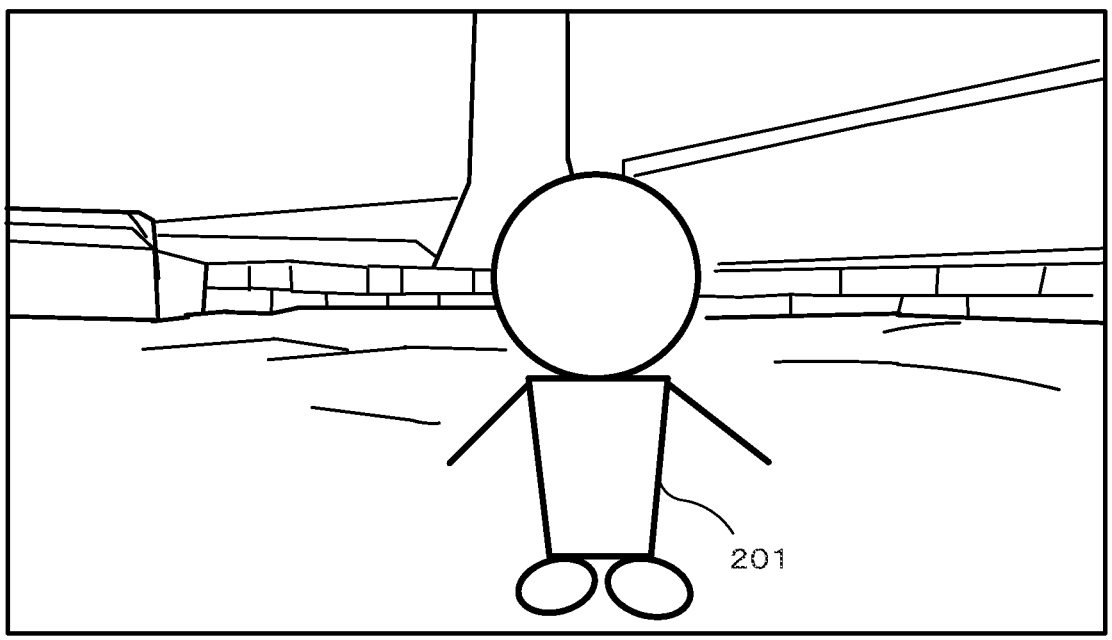
FIG. 15 shows a non-limiting example of the game screen according to the exemplary embodiment.

Then, if the operation for lowering the virtual camera is further continuously performed, a screen is finally displayed as shown in FIG. 15. FIG. 15 shows a screen example when the virtual camera is located at the "position H". At this time, the line-of-sight direction is horizontal (the depression angle is 0 degrees). In the exemplary embodiment, when the depression angle of the virtual camera reaches 0 degrees, the virtual camera does not move downward any further.

As described above, in the exemplary embodiment, when a plurality of hiding objects that hide the object of interest are present on the virtual line from the virtual camera to the object of interest, the virtual camera is not moved so as to cross these hiding objects at one time, but is moved stepwise so as to cross the plurality of hiding objects one by one. Accordingly, when a plurality of hiding objects are present in front of the virtual camera, a rapid change in viewpoint in which the virtual camera moves instantaneously can be suppressed, and visibility can be improved.

Figure 16:
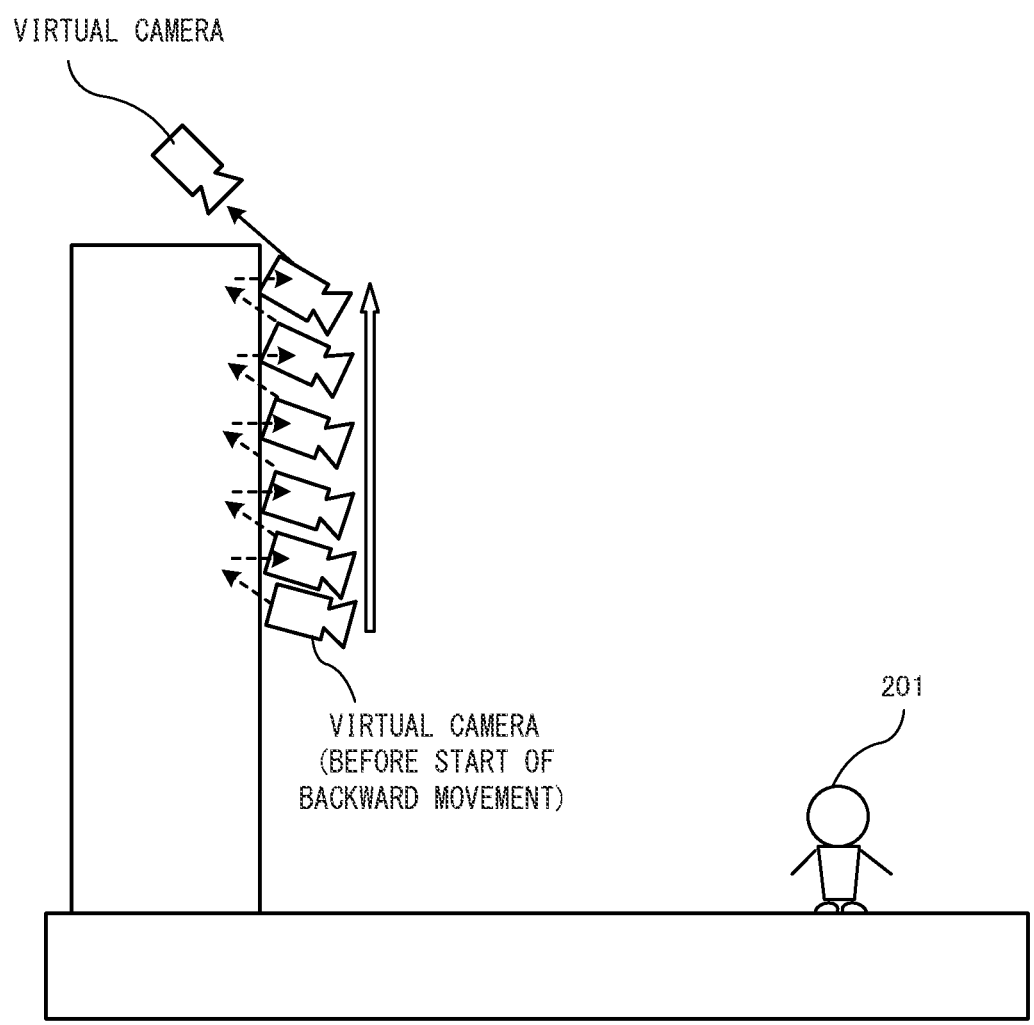
FIG. 16 illustrates the outline of the processing according to the exemplary embodiment.

In the exemplary embodiment, the example in which the virtual camera is manually operated is illustrated. Therefore, for example, the user can also perform an operation for increasing the depression angle of the virtual camera. As described above, when the depression angle of the virtual camera increases, the distance from the virtual camera to the PC 201 also increases. Therefore, the virtual camera moves in the direction away from the PC 201. That is, the user can also move the virtual camera in a direction opposite to the direction toward the PC 201, by performing the operation for increasing the depression angle of the virtual camera. Supplementary description will be given regarding how the virtual camera moves in this case. FIG. 16 shows an example of how the virtual camera moves, for example, when the user performs the operation for increasing the depression angle of the virtual camera (operation for increasing the distance between the virtual camera and the PC 201) after the virtual camera performs the slip-through movement through a certain hiding object. As the movement of the virtual camera in such a case, the virtual camera moves backward from the slip-through destination position, and a position at which the virtual camera is buried in the hiding object can be calculated as a movement destination. As viewed from the movement destination, the PC 201 is hidden and the virtual camera is in contact with (buried in) the hiding object. Therefore, the above slip-through position is determined as the movement destination of the virtual camera. As a result, the virtual camera moves to a position that is slightly higher than the original position. By repeating this processing, as a result, the virtual camera moves upward along a wall surface of the hiding object. Then, when the virtual camera reaches the top of the hiding object and no object with which the virtual camera is in contact is present behind the virtual camera, the virtual camera moves backward therefrom (moves upward away from the PC 201).

[Details of Virtual Camera Control Processing of Exemplary Embodiment]

Figure 17:
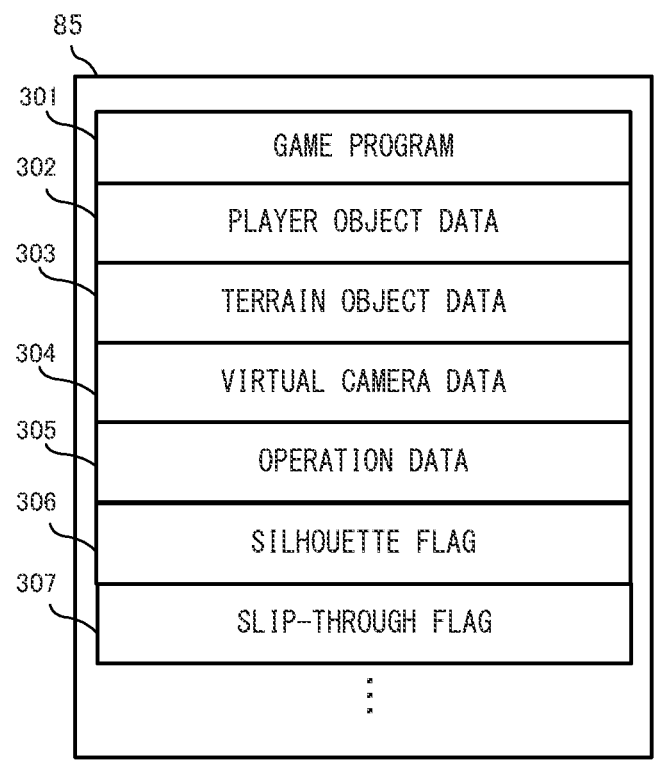
FIG. 17 illustrates a memory map showing a non-limiting example of various kinds of data stored in a DRAM 85.
Figure 18:
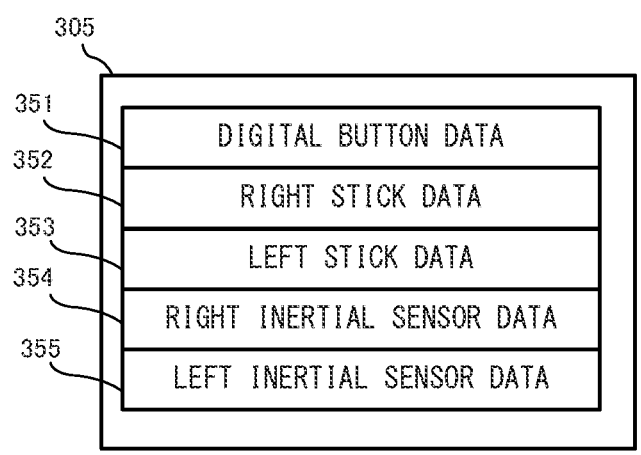
FIG. 18 shows a non-limiting example of operation data 305.

Next, the virtual camera control processing in the exemplary embodiment will described in more detail with reference to FIG. 17 to FIG. 19.

[Data to be Used]

First, various kinds of data to be used in the processing will be described. FIG. 17 illustrates a memory map showing an example of various kinds of data stored in the DRAM of the main body apparatus 2. In the DRAM 85 of the main body apparatus 2, at least a game program 301, player object data 302, terrain object data 303, virtual camera data 304, operation data 305, a silhouette flag 306, and a slip-through flag 307 are stored.

The game program 301 is a program for executing game processing including the virtual camera control processing in the exemplary embodiment.

The player object data 302 is data regarding the above PC 201. The player object data 302 includes position data indicating the position of the PC 201, orientation data indicating the orientation of the PC 201, etc.

The terrain object data 303 is data of terrain objects to be placed in the virtual space. The terrain object data 303 includes an ID for uniquely identifying each terrain object, information indicating the placement position of the terrain object, model data indicating the shape of the terrain object, polygon data, etc.

The virtual camera data 304 is data for controlling the virtual camera. The virtual camera data 304 includes data indicating the position, orientation (depression angle), angle of view, movement speed, etc., of the virtual camera.

The operation data 305 is data obtained from the controller operated by the user. That is, the operation data 305 is data indicating the content of an operation performed by the user. FIG. 18 illustrates an example of the data structure of the operation data 305. The operation data 305 includes at least digital button data 351, right stick data 352, left stick data 353, right inertial sensor data 354, and left inertial sensor data 355. The digital button data 351 is data indicating pressed states of various buttons of the controllers. The right stick data 352 is data for indicating the content of an operation on the right stick 52. Specifically, the right stick data 352 includes two-dimensional data of x and y. The left stick data 353 is data for indicating the content of an operation on the left stick 32. The right inertial sensor data 354 is data indicating the detection results of the inertial sensors such as the acceleration sensor 114 and the angular velocity sensor 115 of the right controller 4. Specifically, the right inertial sensor data 354 includes acceleration data for three axes and angular velocity data for three axes. The left inertial sensor data 355 is data indicating the detection results of the inertial sensors such as the acceleration sensor 104 and the angular velocity sensor 105 of the left controller 3.

The silhouette flag 306 is a flag for indicating whether or not to display the PC 201 as a silhouette. When the silhouette flag 306 is ON, it indicates that the PC 201 is to be displayed as a silhouette.

The slip-through flag 307 is a flag for determining whether or not to move the virtual camera to the above-described slip-through destination position. The slip-through flag 307 is initially OFF, and when the slip-through flag 307 is ON, it indicates that it is necessary to move the virtual camera to the slip-through destination position.

In addition, various kinds of data required for the game processing, which are not shown, are also stored in the DRAM 85.

[Details of Processing Executed by Processor 81]

Next, the details of the virtual camera control processing in the exemplary embodiment will be described. In the exemplary embodiment, a flowchart described below is realized by one or more processors reading and executing the above program stored in one or more memories. The flowchart described below is merely an example of the processing. Therefore, the order of each process step may be changed as long as the same result is obtained. In addition, the values of variables and thresholds used in determination steps are also merely examples, and other values may be used as necessary.

Figure 19:
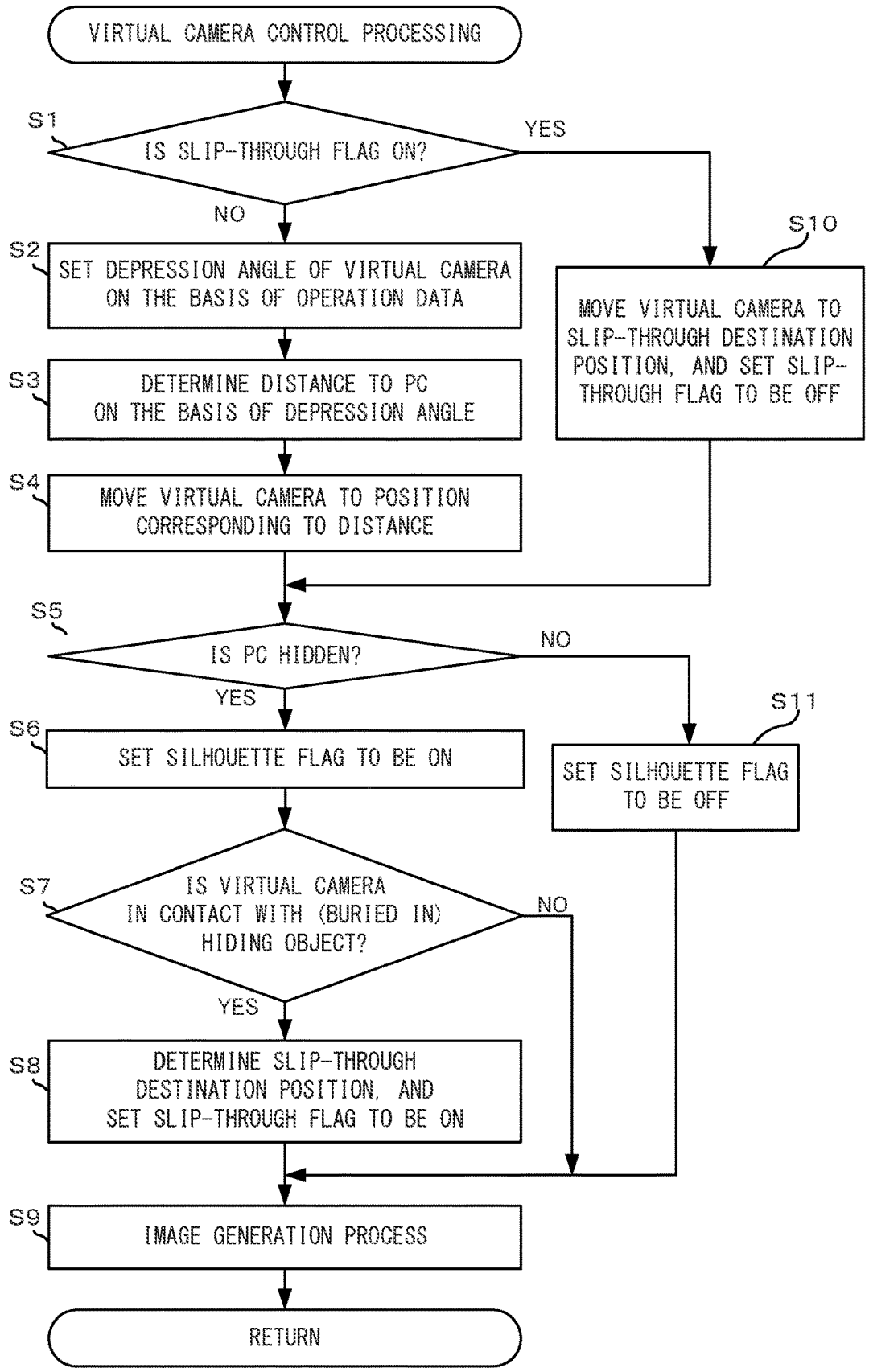
FIG. 19 is a flowchart showing the details of virtual camera control processing according to the exemplary embodiment.

FIG. 19 is a flowchart showing the details of the virtual camera control processing according to the exemplary embodiment. The processing related to the flowchart is repeatedly executed every frame period. It is assumed that prior to the execution of the processing, a predetermined terrain object and the PC 201 have already been placed in the virtual space.

First, in step S1, the processor 81 determines whether or not the slip-through flag 307 is ON, on the basis of the operation data 305. As a result of the determination, if the slip-through flag 307 is OFF (NO in step S1), in step S2, the processor 81 sets the depression angle of the virtual camera (i.e., changes the orientation of the virtual camera) on the basis of the operation data 305. Subsequently, in step S3, the processor 81 determines a distance from the virtual camera to the PC 201 on the basis of the above set depression angle. As described above, this distance is determined to be larger when the depression angle is larger. Then, in step S4, the processor 81 moves the virtual camera to a position corresponding to the above determined distance (if the depression angle and the distance are determined, the position is also necessarily determined.)

Next, in step S5, the processor 81 determines whether or not the PC 201 is hidden by any hiding object as viewed from the virtual camera. That is, the processor 81 determines whether or not a hiding object is present on the virtual line from the virtual camera toward the PC 201. As a result of the determination, if the PC 201 is not hidden (NO step S5), in step S11, the processor 81 sets the silhouette flag 306 to be OFF. Then, the processor 81 advances the processing to step S9 described later.

On the other hand, if the PC 201 is hidden (YES in step S5), in step S6, the processor 81 sets the silhouette flag 306 to be ON. Accordingly, when the PC 201 is hidden as viewed from the virtual camera, setting for displaying the PC 201 as a silhouette is performed.

Next, in step S7, the processor 81 determines whether or not the virtual camera is in contact with the hiding object. As a result of the determination, if the virtual camera is not in contact with the hiding object (NO in step S7), the processor 81 advances the processing to step S9 described later. On the other hand, if the virtual camera is in contact with the hiding object (YES in step S7), in step S8, the processor 81 determines the above-described slip-through destination position on the basis of the positional relationship between the PC 201 and the hiding object with which the virtual camera is currently in contact. Then, the processor 81 sets the slip-through flag 307 to be ON.

Next, in step S9, the processor 81 generates a game image by taking an image of the virtual space with the virtual camera. At this time, if the silhouette flag 306 is ON, the processor 81 generates an image in which the PC 201 is displayed as a silhouette. Then, the processor 81 outputs the generated game image to the stationary monitor or the like.

Next, a process in the case where, as a result of the determination in step S1 above, the slip-through flag 307 is ON will be described. In this case, in step S10, the processor 81 moves the virtual camera to the slip-through destination position determined in step S8 above. That is, the processor 81 moves the virtual camera to the slip-through destination position determined by the processing in the immediately previous frame. Furthermore, the processor 81 sets the slip-through flag 307 to be OFF. Then, the processor 81 advances the processing to step S5 above.

The above-described processing is repeatedly executed every frame period until, for example, a game end condition is satisfied. This is the end of the detailed description of the virtual camera control processing according to the exemplary embodiment.

As described above, in the exemplary embodiment, when a plurality of hiding objects are present in front (in the imaging direction) of the virtual camera, the virtual camera is moved stepwise so as to cross the plurality of hiding objects one by one. Accordingly, a rapid change in viewpoint due to the virtual camera moving at one time for a distance that is large to some extent can be suppressed, and visibility can be improved.

[Modifications]

As for the re-movement condition, the re-movement condition that the virtual camera comes into contact with the above-described "second hiding object" has been illustrated above as an example. In this regard, another condition may be used as the re-movement condition. The other re-movement condition may be, for example, that a predetermined waiting time elapses from the timing when the virtual camera is moved to the first position. In addition, the re-movement condition may be, for example, that the virtual camera moves (toward the object of interest) for a predetermined distance or more from the timing when the virtual camera is moved to the first position. These conditions may be used in combination for determination.

As for the control of the virtual camera, in the above embodiment, the example in which the distance between the virtual camera and the object of interest increases as the depression angle of the virtual camera increases, has been illustrated. In another exemplary embodiment, control in which the position of the virtual camera is moved closer to the object of interest or away from the object of interest without changing the depression angle of the virtual camera, may be performed.

In the above embodiment, the case where the series of processes related to the game processing is performed in the single main body apparatus 2 has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses. In addition, a so-called cloud gaming configuration may be adopted. For example, the main body apparatus 2 may be configured to send operation data indicating a user's operation to a predetermined server, and the server may be configured to execute various kinds of game processing and stream the execution results as video/audio to the main body apparatus 2.

While the present disclosure has been described in detail, the foregoing description is in all aspects illustrative and not restrictive. It is to be understood that numerous other modifications and variations can be devised without departing from the scope of the present disclosure.

What is claimed is:

1. A non-transitory computer-readable storage medium having stored therein instructions that, when executed by a computer of an information processing apparatus, cause the computer of the information processing apparatus to perform operations comprising:
   determining whether or not at least a part of an object of interest is hidden by a first hiding object as viewed from a virtual camera configured to take an image of the object of interest in a virtual space;
   moving the virtual camera, on a virtual line from the virtual camera toward the object of interest, to a first position that is a position where the virtual line first passes through the first hiding object, on the basis of at least a part of the object of interest being determined to be hidden by the first hiding object; and
   when the virtual camera is moved to the first position, if at least a part of the object of interest is further hidden by a second hiding object, not moving the virtual camera to a second position that is a position where the virtual line first passes through the second hiding object while a re-movement condition is not satisfied, and then moving the virtual camera to the second position when the re-movement condition is subsequently satisfied.

2. The non-transitory computer-readable storage medium according to claim 1, wherein, when the virtual camera comes into contact with or becomes buried in the first hiding object, the virtual camera is moved to the first position.

3. The non-transitory computer-readable storage medium according to claim 1, wherein, when the virtual camera comes into contact with or becomes buried in the second hiding object, it is determined that the re-movement condition is satisfied, and the virtual camera is moved to the second position.

4. The non-transitory computer-readable storage medium according to claim 1, wherein, when a predetermined time elapses from a timing when the virtual camera is moved to the first position, it is determined that the re-movement condition is satisfied.

5. The non-transitory computer-readable storage medium according to claim 1, wherein, when the virtual camera moves for a predetermined distance or more from a timing when the virtual camera is moved to the first position, it is determined that the re-movement condition is satisfied.

6. The non-transitory computer-readable storage medium according to claim 1, wherein the virtual camera is controlled such that a distance between the virtual camera and the object of interest is shortened as a depression angle of the virtual camera decreases.

7. The non-transitory computer-readable storage medium according to claim 1, wherein at least either one of a position and an orientation of the virtual camera is controlled on the basis of a camera control input by a user.

8. The non-transitory computer-readable storage medium according to claim 1, wherein the object of interest is a player character.

9. The non-transitory computer-readable storage medium according to claim 1, wherein, when at least a part of the object of interest is hidden by the hiding object as viewed from the virtual camera, at least the part of the object of interest is rendered so as to be viewable through the hiding object.

10. The non-transitory computer-readable storage medium according to claim 1, wherein the virtual camera is moved and an orientation of the virtual camera is changed with the object of interest as a gazing point of the virtual camera.

11. An information processing apparatus, comprising:
   a memory storing a program and coupled to a processor, the processor being configured to execute the program to perform operations comprising;
   determining whether or not at least a part of an object of interest is hidden by a first hiding object as viewed from a virtual camera configured to take an image of the object of interest in a virtual space;

moving the virtual camera, on a virtual line from the virtual camera toward the object of interest, to a first position that is a position where the virtual line first passes through the first hiding object, on the basis of at least a part of the object of interest being determined to be hidden by the first hiding object; and when the virtual camera is moved to the first position, if at least a part of the object of interest is further hidden by a second hiding object, not moving the virtual camera to a second position that is a position where the virtual line first passes through the second hiding object while a re-movement condition is not satisfied, and then moving the virtual camera to the second position when the re-movement condition is subsequently satisfied.

12. An information processing system, comprising:
a memory coupled to a processor configured to control the information processing system to at least:
determine whether or not at least a part of an object of interest is hidden by a first hiding object as viewed from a virtual camera configured to take an image of the object of interest in a virtual space;
move the virtual camera, on a virtual line from the virtual camera toward the object of interest, to a first position that is a position where the virtual line first passes through the first hiding object, on the basis of at least a part of the object of interest being determined to be hidden by the first hiding object; and
when the virtual camera is moved to the first position, if at least a part of the object of interest is further hidden by a second hiding object, not move the virtual camera to a second position that is a position where the virtual line first passes through the second hiding object while a re-movement condition is not satisfied, and then move the virtual camera to the second position when the re-movement condition is subsequently satisfied.

13. An information processing method for use with information processing apparatus, the information processing method comprising:
determining whether or not at least a part of an object of interest is hidden by a first hiding object as viewed from a virtual camera configured to take an image of the object of interest in a virtual space;
moving the virtual camera, on a virtual line from the virtual camera toward the object of interest, to a first position that is a position where the virtual line first passes through the first hiding object, on the basis of at least a part of the object of interest being determined to be hidden by the first hiding object; and
when the virtual camera is moved to the first position, if at least a part of the object of interest is further hidden by a second hiding object, not moving the virtual camera to a second position that is a position where the virtual line first passes through the second hiding object while a re-movement condition is not satisfied, and then moving the virtual camera to the second position when the re-movement condition is subsequently satisfied.

14. The information processing method according to claim 13, wherein, when a predetermined time elapses from a timing when the virtual camera is moved to the first position, it is determined that the re-movement condition is satisfied.

15. The information processing method according to claim 13, wherein, when the virtual camera moves for a predetermined distance or more from a timing when the virtual camera is moved to the first position, it is determined that the re-movement condition is satisfied.

16. The information processing method according to claim 13, wherein the virtual camera is controlled such that a distance between the virtual camera and the object of interest is shortened as a depression angle of the virtual camera decreases.

17. A computer-readable non-transitory storage medium having stored therein instructions that, when executed by a computer of an information processing apparatus, cause the computer of the information processing apparatus to:
determine whether or not a virtual camera is in contact with or buried in a hiding object;
move the virtual camera closer to an object of interest such that the first hiding object is not captured by the virtual camera, on the basis of the virtual camera being determined to be in contact with or buried in the first hiding object; and
when the virtual camera is moved closer to the object of interest such that the first hiding object is not captured by the virtual camera, even if at least a part of the object of interest is further hidden by another hiding object, when the virtual camera is not in contact with or buried in the other hiding object, not move the virtual camera closer to the object of interest such that the other hiding object is not captured by the virtual camera.

18. An information processing apparatus, comprising:
a memory storing a program and coupled to a processor, the processor being configured to execute the program to perform operations comprising:
determining whether or not a virtual camera is in contact with or buried in a hiding object;
moving the virtual camera closer to an object of interest such that the first hiding object is not captured by the virtual camera, on the basis of the virtual camera being determined to be in contact with or buried in the first hiding object; and
when the virtual camera is moved closer to the object of interest such that the first hiding object is not captured by the virtual camera, even if at least a part of the object of interest is further hidden by another hiding object, when the virtual camera is not in contact with or buried in the other hiding object, not moving the virtual camera closer to the object of interest such that the other hiding object is not captured by the virtual camera.

19. An information processing system, comprising:
a memory coupled to a processor configured to control the information processing system to at least:
determine whether or not a virtual camera is in contact with or buried in a hiding object;
move the virtual camera closer to an object of interest such that the first hiding object is not captured by the virtual camera, on the basis of the virtual camera being determined to be in contact with or buried in the first hiding object; and
when the virtual camera is moved closer to the object of interest such that the first hiding object is not captured by the virtual camera, even if at least a part of the object of interest is further hidden by another hiding object, when the virtual camera is not in contact with or buried in the other hiding object, not move the virtual camera closer to the object of interest such that the other hiding object is not captured by the virtual camera.

20. An information processing method for use with an information processing apparatus, the information processing method comprising:

determining whether or not a virtual camera is in contact with or buried in a hiding object;

moving the virtual camera closer to an object of interest such that the first hiding object is not captured by the virtual camera, on the basis of the virtual camera being determined to be in contact with or buried in the first hiding object; and when the virtual camera is moved closer to the object of interest such that the first hiding object is not captured by the virtual camera, even if at least a part of the object of interest is further hidden by another hiding object, when the virtual camera is not in contact with or buried in the other hiding object, not moving the virtual camera closer to the object of interest such that the other hiding object is not captured by the virtual camera.

* * * * *